United States Patent [19]

Meckler

[11] 4,024,908
[45] May 24, 1977

[54] SOLAR POWERED HEAT RECLAMATION AIR CONDITIONING SYSTEM

[76] Inventor: Milton Meckler, 16348 Tupper St., Sepulveda, Calif. 91343

[22] Filed: Jan. 29, 1976

[21] Appl. No.: 653,345

[52] U.S. Cl. .................................. 165/18; 60/641; 60/655; 62/467 PR; 165/50; 237/1 A
[51] Int. Cl.² ...................................... F24D 11/00
[58] Field of Search ................. 62/2, 236, 238, 92, 62/467 PR; 165/18, 50, 58; 237/1 A; 60/641, 655

[56] References Cited

UNITED STATES PATENTS

| | | | |
|---|---|---|---|
| 3,931,806 | 1/1976 | Hayes | 165/18 X |
| 3,960,322 | 6/1976 | Ruff et al. | 62/2 |
| 3,968,652 | 7/1976 | Chevalier | 60/641 |

Primary Examiner—William E. Wayner
Assistant Examiner—William E. Tapolcai, Jr.

[57] ABSTRACT

This invention relates to the air conditioning of a building complex comprised of one or more zones, utilizing solar insolation and terrestrial re-radiation to a maximum extent and supplemented by external energy as may be required. The principle of thermodynamic availability is employed in a water source system advantageously storing heated and chilled fluid for subsequent heat exchange, and by the diversion of high heat range fluid through a Rankine cycle prime mover for motivation of vapor compression refrigeration or the generation of electrical power dependent upon the availability of solar energy and the demand of said refrigeration, whereby heat energy is claimed and reclaimed and made available to reduce the net energy requirements necessary to provide both heating and cooling of said building complex zones.

30 Claims, 7 Drawing Figures

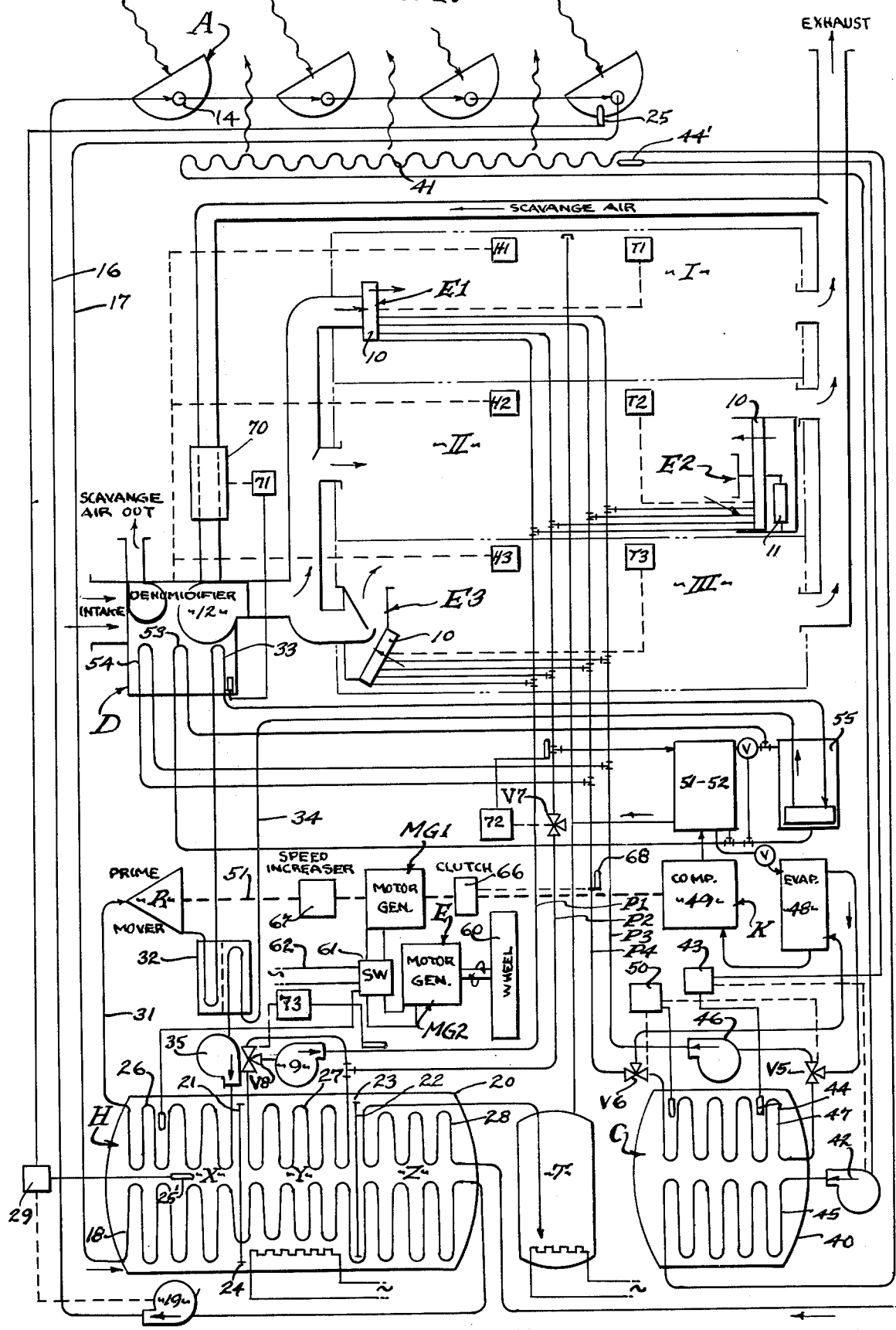

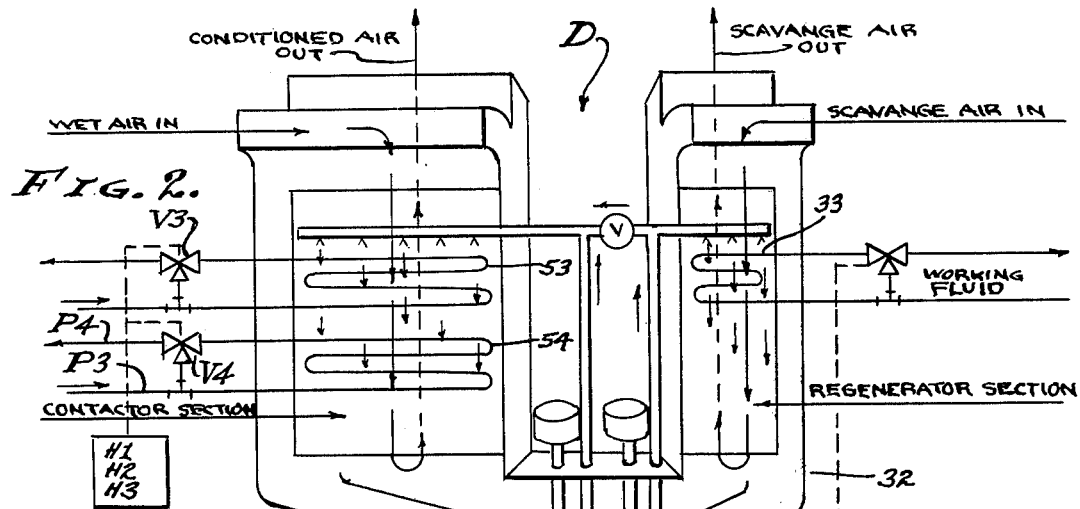
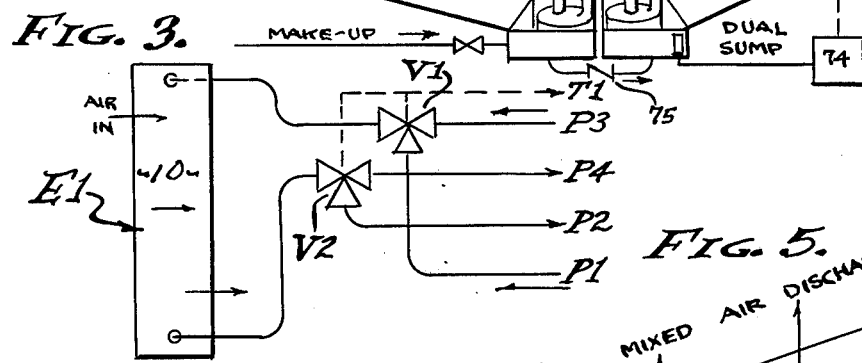
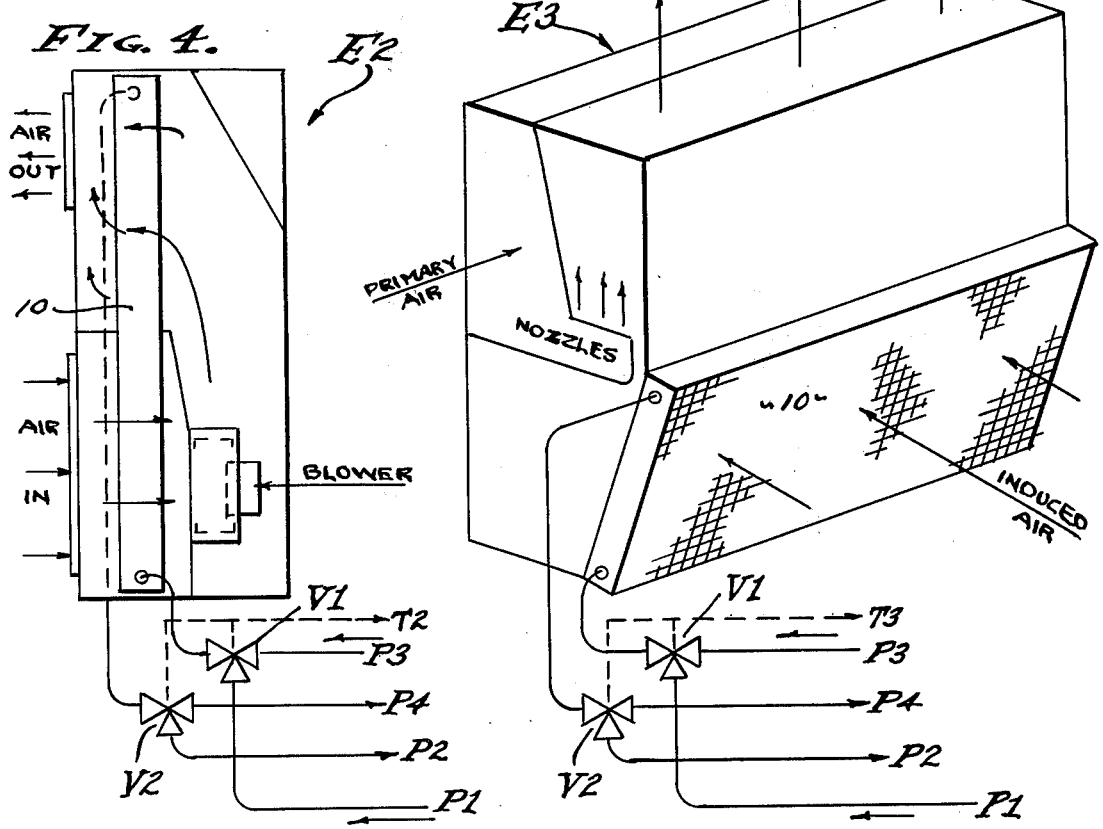

SOLAR POWERED HEAT RECLAMATION AIR CONDITIONING SYSTEM

BACKGROUND

Air conditioning systems involve the correlation of air distribution circuits, heating and cooling storage and fluid transfer circuits, and energy therefor; all for maintaining a temperature range within one or more zones of a building complex. Energy is normally consumed by the expenditure of resources and supplemented by "solar insolation" for applied heating and by "terrestrial re-radiation" for applied cooling. It is a "water source" system with which this invention is concerned, a system that is adaptable to the storage of heated and chilled fluids and the distribution of the same to various building zones according to demand. Maximum reliance upon solar heating and terrestrial re-radiation is a primary object of this invention, with a minimum expenditure of externally supplied energy.

Solar heating and cooling by re-radiation are not totally sufficient in most instances for adequate conditioning and it is contemplated that an outside energy source such as a fuel or electrical power or the like be relied upon as circumstances require. Efficiencies are realized with the use of insulation, re-circulation and cleaning of the conditioned air, and by the exchange and/or sharing of heating and cooling requirements of separately conditioned zones within the building complex. Nevertheless, heating and cooling systems can be wasteful in expending energy for their operation and it is a general object of this invention, therefore, to maximize the availability of solar isolation and to conserve and reclaim energy in an air conditioning system and especially in a water source or fluid system. With the present invention, the available heat content of separately stored fluid masses is maximized for both heating and cooling.

The consumption of fuel and electrical energy in the operation of a building complex goes to provide relatively low heat end uses, such as domestic hot water heating in the range of 125°–140° F and space heating by forced convection in the range of 95°–110° F. The burning of a high quality fuel at relatively high combustion temperatures such as 1800° F is fundamentally wasteful when its heat is transferred to the said low temperature uses. For example, the use of direct combustion of fuel to heat water requires approximately eight times as much fuel as that required by a Rankine cycle prime mover doing the same work, even when discounting the usual combustion process losses; i.e., domestic water heaters have a maximum heat transfer efficiency of about 70%. In other words, work as contrasted with heat is intrisically the more valuable form of energy, and the measurable value of a fuel is stated as "the extent to which its energy content can be converted to work", and this quality is the "thermodynamic availability" of the fuel. The measurement of efficiency at the point of consumption is based upon a comparison of thermodynamic availability actually consumed. For instance, in the operation of an on-site boiler heated with fossil fuel, the ratio of the thermodynamic availability required to the thermodynamic availability consumed is estimated for space heating to be about 0.03 or less, and for domestic water heating to be about 0.10 or less. For electrically driven refrigeration the said ratio is about 0.12 or less. With the present invention, incident solar energy is made available to do work by operating a heat engine, preferably a Rankine cycle prime mover, by which work is irreversibly extracted and the remaining thermal energy staged in a stratified storage at temperatures conducive to the efficient operation for each process involved; namely space heating, and domestic water heating, all to the end that loss of thermodynamic availability is minimized. It is an object therefore to trade off the installation costs making available solar energy by insolation against reduced fuel consumption, all without sacrificing conventional performance.

In air conditioning systems of the type under consideration a portion of the energy is lost from condensors, evaporators and compressors, to become waste heat, and it is an object to reclaim this heat as such and/or to contain it within the system as energy. To this end a stratified thermal mass is provided for the storage of solar heat used in the operation of one or more water source heat exchangers and/or induction type exchangers, and to operate a Rankine cycle prime mover for motivating vapor compression refrigeration used to chill a water source and with one of its closed circuit condensor systems combined with heating coils of the air conditioning system.

Vapor compression refrigeration requires power for its operation and the aforementioned Rankine cycle prime mover is available to serve this power when sufficient solar energy is available, and to this end the said prime mover is coupled to the mechanical refrigeration for its motivation, it being an object to claim solar energy for system use. In the event that solar energy is insufficient, an externally powered motor-generator is also coupled to the mechanical refrigeration for its motivation with or without solar energy assistance. And, in the event that solar energy is available when motivation of mechanical refrigeration is not required, the said motor-generator is uncoupled from the mechanical refrigeration and remains coupled to the Rankine cycle prime mover for the generation of power into the electrical energy source system to be used elsewhere or in operating the system.

It is an object of this invention to advantageously employ heat concentrating solar collectors, preferably of the panel-tube type, and the storage of energy therefrom for subsequent heat exchange and to operate a Rankine cycle prime mover for the motivation of mechanical vapor compression refrigeration. With this invention, the collection of solar energy to be used through heat exchange or by the Rankine cycle prime mover is shared in the water source system by transmission through the stratified storage where the moderate heat range of fluid stored for zonal heat exchange is separated from the high heat range of fluid stored for prime mover operation.

It is also an object of this invention to reduce the size requirement of refrigeration machinery and prime mover therefor by drawing upon storage of chilled fluid during periods of peak cooling load demand. With the present invention, waste heat normally rejected to atmosphere by Rankine cycle prime mover systems is advantageously utilized so that overall system efficiency is significantly improved. Further, it is an object to realize efficiency by claiming and/or reclaiming power, and with the present invention excess power derived by solar insolation is stored and thereby conserved for subsequent extraction on demand of the system.

It is also an object of this invention to advantageously employ terrestrial re-radiation of heat from the system, with the storage of water chilled thereby in storage separate from the aforesaid stratified heat storage.

It is another object of this invention to advantageously employ a low heat range water storage for pre-heating a domestic hot water system of the building complex, to be supplemented by fuel or an outside energy source as circumstances require. The high and moderate heat range levels are supplemented and/or maintained for efficient operation of the system by means of controlled heater means within the stratified sections of the thermal storage and operated from a fuel or outside energy source.

DRAWINGS

The various objects and features of this invention will be fully understood from the following detailed description of the typical preferred form and application thereof, throughout which description reference is made to the accompanying drawings, in which:

FIG. 1 is a block diagram of the solar powered heat reclamation air conditioning system.

FIG. 2 is a diagramatic view of the dehumidifier of the system.

FIGS. 3, 4, and 5 are diagramatic views of the zone heat exchangers of the system.

Figure 6:
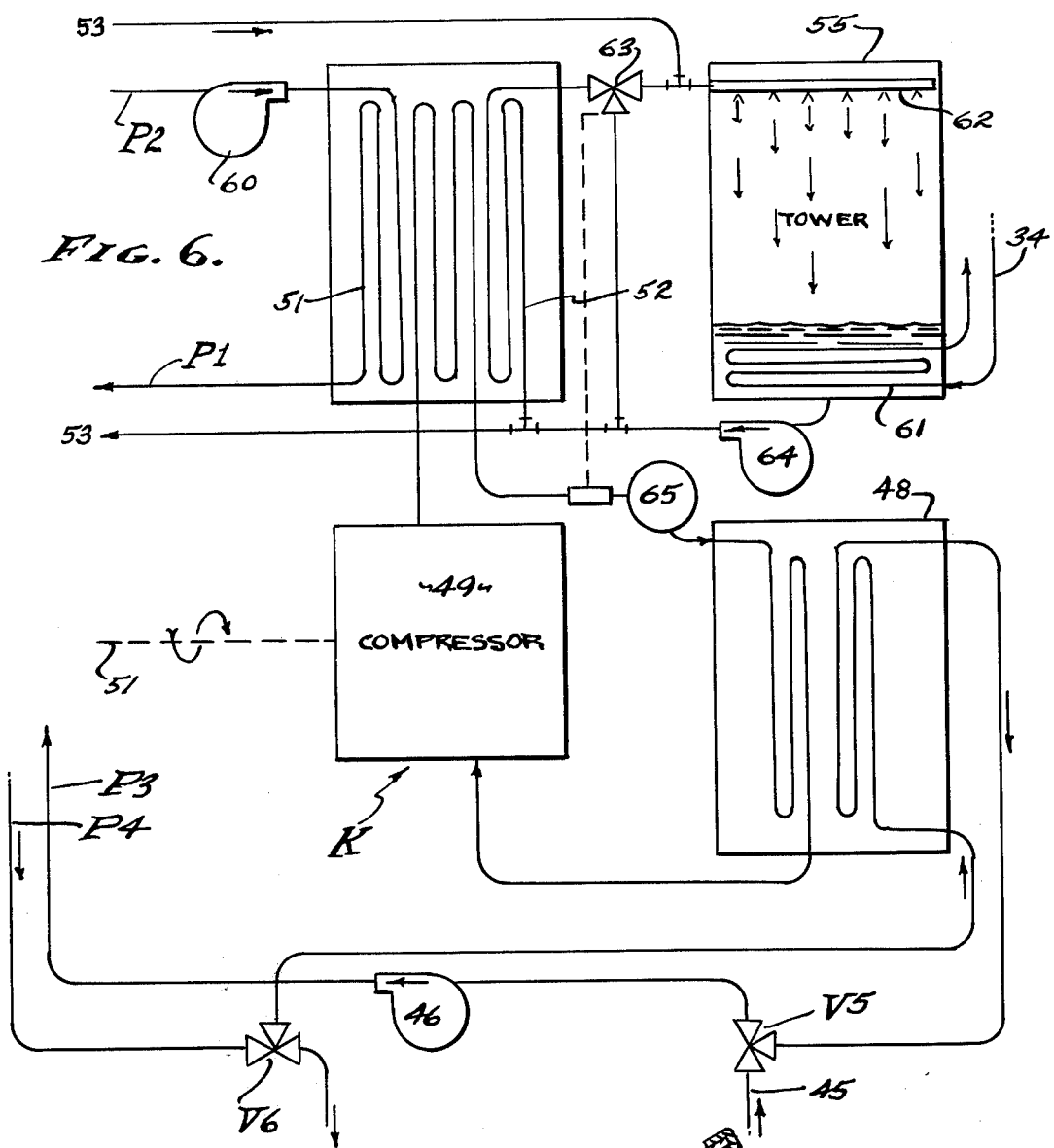
Figure 7:
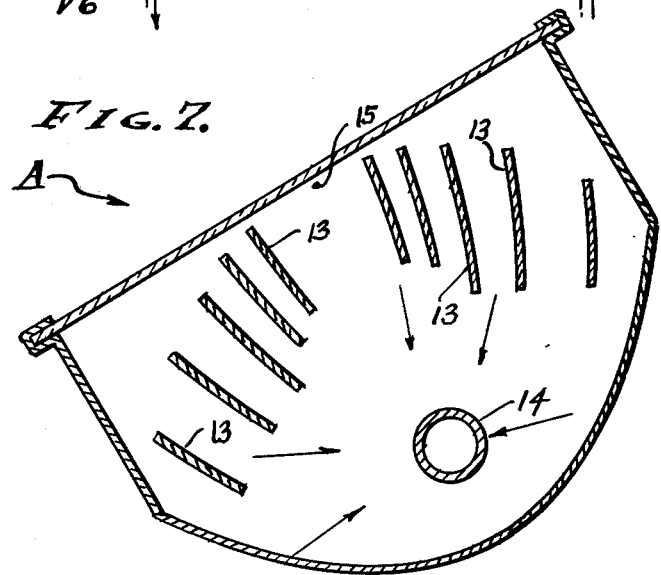

FIG. 6 is a diagramatic view of the vapor compression refrigeration means of the system. And, FIG. 7 is a transverse sectional view taken through a typical embodiment of one of the concentrator solar collectors of the system.

PREFERRED EMBODIMENT

This invention has to do with a heat exchange water or fluid source air conditioning system adapted to a building complex comprised of a plurality of separate zones to be air conditioned. Both heating and cooling is provided for and it is preferred that a four-pipe system be employed; namely a pair of pipes P1 and P2 for the heating fluid circuit and a pair of pipes P3 and P4 for the chilled fluid circuit. The heat exchange unit at each zone I, II, and III to be conditioned can vary as required and is illustrated in the drawings as a simple fan-coil exchanger E1, a heat riser exchanger E2, or an induction exchanger E3. These exchangers employ coils 10 that conduct tempered fluid therethrough, either heated or chilled, the circulation of conditioned air being by fan 11 or by induction with primary air as supplied by blower 12 through a dehumidifier means D.

The water or fluid source is provided in the form of a heated thermal mass H with the pipes P1 and P2 extended therefrom and to the zones throughout the building complex represented by zones I, II, and III, and a chilled thermal mass C with the pipes P3 and P4 also extended therefrom and throughout the said zones of the building complex. The pipes P1–P4 are insulated pipes that extend in parallel relation to each other, the supply pipes P1 and P3 extending to a sequence valve V1 at each exchanger E1–E3, and the return pipes P2 and P4 extending to a diverting valve V2 at each exchanger E1–E3. The valves V1 and V2 are interlocked mechanically or electrically (or otherwise) so as to sequence the flow from a pump 9 through a supply pipe P1 while diverting the flow through the exchanger to return pipe P2; or so as to sequence the flow from supply pipe P3 while diverting the flow through the exchanger to return pipe P4. In each instance the flow of tempering fluid is through the coil 10 of the exchanger as controlled by the two valves V1 and V2. A valve V8 modifies the loop of coil 27 as related to pipes P1 and P2 and is governed by control means 73 to modulate valve V8 as required to hold heating hot water temperature as set by a master located in outside air.

Referring now to the collection of solar energy, it is preferred that non-tracking panel or tube type concentrating collectors A be employed as is indicated; for example, collectors utilizing glazing and incidence mirrors as shown in FIG. 7. Such a collector is comprised of an array of parabolic mirror surfaces 13 situated such that a large fraction of incoming solar rays strike the mirror surfaces at incident angles greater than 60°, such large incident angles resulting in high reflectivity from said reflective surfaces with their parabolic segments focused onto the center tube 14 of the panel. The array of mirrors 13 serves to reduce heat losses from the tube 14, and convective air current are impeded by the baffle-like array, and further the radiation losses are reduced since a large fraction of the collector tube 14 "sees" relatively warm mirror surfaces. A collector panel-tube of this description operates successfully with an aperature 15 to collector tube 14 ratio of 8:1 and an acceptance level for increasing solar rays of approximately 14°. In practice, a battery of panel-tubes A is employed as illustrated in a closed loop heating fluid circuit comprised of a delivery line 16 and a return line 17 extending from a heat exchanging coil 18 immersed coextensively throughout the high to low heat range sections X, Y and Z of a liquid storage tank 20. A pump 19 circulates a high boiling point heat transfer fluid such as "Dowtherm-A" as manufactured by Dow Chemical Co. of Midland, Mich. or liquids such as chlorinated biphenol, monochlorobenzene or a solution of water and ethylene glycol, for the absorption of solar heat by means of insolation. The collectors A, as they are operatively associated with the heated thermal mass H, are for the collective storage of solar heat and to this end the lines 16 and 17 are open and the pump 19 is operated by a differential heat control means 29 with temperature responsive means 25 and 25' at the collector and thermal mass respectively. The control means 29 is set so that the pump operates only when the collector temperature is greater than the highest temperature within the thermal mass H.

Referring now to the heated thermal mass H, there are three stratifications in the liquid storage tank 20 having vertically disposed partitions 21 and 22 separating the tank into a high heat range section X, a moderate heat range section Y and a low heat range section Z. The tank 20 is horizontally disposed and filled with a high boiling point liquid mass such as the aforementioned "Dowtherm-A" or equivalent, in which case the partitions are provided with upper and lower liquid or water transfer ports 23 and 24 for the convection flow or thermal syphon effect of liquid from one compartment section to the other. Thus, cooler liquids from section Y will enter into section X through lower ports 24 while hotter liquids discharge from section X into section Y through the upper ports 23; and independently, cooler liquid from section Z will enter into section Y through lower ports 24 while hotter liquids discharge from section Y into section Z through the upper ports 23. In carrying out the present invention, and in practice, a normal operational temperature range for section X is up to 300°–400° F, for section Y is up to 240° F, and for section Z is up to 114° F; however, it is to be understood that these temperature ranges will vary greatly dependent upon the availability of solar heat, the type of collector, the working fluid employed, and the use to which the system is put. Tank 20 is insulated (not shown).

In accordance with the invention, the coextensive heating coil 18 is complementary to the aforesaid heat range stratification, having its hottest portion within section X, its moderate heat portion within section Y, and its low portion within section Z, all of which advantageously employs the maximum temperature differential available within the heated thermal mass H. It will be apparent, therefore, that there is a high heat range, a moderate heat range and a low heat range portion of the thermal mass that is stored in the tank 20, and each associated with heat transfer coils 26, 27, and 28, respectively, that induce the aforesaid heat range differentiations by their induction, conduction and dissipation of heat. As is indicated, supplementary mass, not shown, is installed residually in each of said sections X, Y, and Z respectively, and each communicatively capable of holding heat according to the section in which they remain, such as solid insoluble material of high heat retaining capabilities.

Immersed in the high heat range section X is the heat transfer and/or exchanging coil 26 for absorbing and conducting a working fluid through a Rankine cycle prime mover R. The coil 26 is a circuit comprised of a pressure line 31 extending to said prime mover R for establishing operating fluid pressure at said prime mover, and from which the said fluid is passed through a regenerator 32 which operates to provide heat exchange between heat transfer media circulating and condensed in an air conditioning heating coil 33 or the like, or in a condenser per se, from which it returns to the heat transfer coil 26 through a return line 34 by means of a said pump or injector 35. The prime mover can be a positive displacement type or an expansion turbine type engine operating on the Rankine cycle supplied with working fluid in the vapor phase at the completion of the high temperature heat transfer process in section X of the thermal mass H, and in the liquid phase at the completion of the lower temperature heat transfer process in the regenerator 32 — condensing coil 33 — and tower (55) coil later described. Although water is a common working fluid, there are many suitable organic fluids whose thermodynamic properties are suitable for low temperature Rankine cycle operation, and which also have other desirable characteristics such as stability under repeated thermal cycling, non-corrosivity, non-inflamability, non-intoxicity, and low cost; organic fluids such as freon.

It is apparent therefore that the Rankine cycle prime mover R is feasible in the solar heated system herein disclosed with concentrator type collectors A as hereinabove described. Lower expander inlet temperatures are utilized, in wich case the ideal Rankine cycle efficiencies, although quite low, are nearer to Carnot efficiency than at higher inlet temperature. This is because with decreasing temperature differential between peak cycle temperature and condensing temperature, the ideal Rankine cycle more closely approximates the Carnot cycle. Efficiencies for all working fluids increase with increasing expander inlet temperature and with decreasing condensing temperature. In practice, low operating pressures are employed in order to minimize the mass of the cycle components; high specific work is imposed in order to minimize the mass flow rate; and low volumetric flow per unit of power is employed to minimize the physical size of the equipment.

Immersed in the moderate heat range section Y is the heat transferring or exchanging coil 27 for absorbing and conducting heat in a transfer fluid through the first mentioned exchangers E1–E3. The coil 27 is in a circuit comprised of the aforementioned pipes P1 and P2 extended through the controlling valves V1 and V2 to the said exchangers and controlled by thermostat means T1–T3 respectively (see FIGS. 3, 4, and 5).

Immersed in the low heat range section Z is the heat transferring or exchanging coil 28 for absorbing and conducting heat to a domestic hot water tank T or the like, for example a conventional electrical powered domestic hot water heater, as shown.

Referring now to the dehumidifier-humidifier D, the flow diagram for such a two-sump liquid absorption unit with extended-surface contactor coils is shown in FIG. 2. The unit employs a strong absorbent or hydroscopic solution that is pumped from one sump and sprayed over coils in a contactor section, a solution such as water and lithium or calcium chloride or ethylene glycol. Air to be dehumidified or humidified is passed over the contactor coils in intimate contact with the hygroscopic solution, the degree of dehumidification or humidification dependent on the concentration, temperature, and characteristics of said solution. Moisture is absorbed from the air by said solution maintained at the proper concentration due to the vapor pressure difference between the air and the solution and is precisely maintained by varying coolant flow applied to the coils so as to control the solution temperature. Heat is generated in absorbing moisture from the air, the latent heat from condensation of water vapor and the heat of solution, or the heat of mixing, of the water and the hygroscopic solution. The solution is maintained at the required temperature by cooling with chilled fluid from the pipe P3 flowing through the second stage contactor coil 54 and with cooling fluid from cooling tower 55 flowing through the first stage contactor coil 53. The quantity of chilling or cooling fluid required is a function of the solution temperature and the total heat, either sensible, latent, or both, removed from the air by the hygroscopic solution. The total heat removal required by the humidifier consists of the heat of absorption, sensible heat removed from the air, and the residual heat load added by the regeneration process. This residual heat load can be substantially reduced by using the two-sump "economizer" system illustrated. In the two-sump or economizer system, a small amount of the cool dilute absorbent solution is metered to the regeneration system and replaced by a correspondingly small amount of warm, highly concentrated solution. This system reduces the heat load on the cooling coils, resulting in economies in the amount of coolant required. In accordance with this invention, the hygroscopic solution is maintained at the required temperature by staged cooling coils in fluid circuits, comprising a first stage heat transfer coil 53 supplied with water from cooling tower 55 and a second stage heat transfer with chilled water from pipe P3. As shown in FIG. 2, three-way diverting valves V3 and V4 are operated by control means with responsive zone humidistats H1, H2, and/or H3 located in the zones I, II, and/or III. The humidistats are of the two-stage type responsive to humidity so as to open valve V3 by means of a first stage operation upon an initial rise in humidity whereby cooling of the solution lowers the outlet dew point of air delivered from the contactor section; and on a further rise in humidity also opens valve V4 by means of a second stage operation whereby further cooling of the hygroscopic solution further lowers the outlet dew point of air delivered from the contactor section. In practice, means is provided so that the zone humidistat having the greatest demand for the aforesaid valve operations will assume control thereover. It is significant that this type of humidifier also has a regenerator section that operates to remove excess moisture from the hygroscopic solution and requires the application of heat for regeneration of the hygroscopic solution. The working fluid flow to the regenerator coil is regulated by a control means responsive to the concentration of the solution circulated over the contactor coils such as a level control, specific gravity control, or boiling point control. For humidifying operations the liquid absorbent is maintained at the required temperature by adding heat in proportion to the water absorbed by the air from the hygroscopic solution, while water is automatically added to the hygroscopic solution in the contactor section so as to maintain the proper concentration. The working fluid flow through coil 33 is also governed by control means 74 in response to the liquid level in the regenerator sump, and as shown, there is an equalizer line between the dual sumps with a check valve 75 permitting flow to the regenerator sump. The absorbent or hygroscopic solution is pumped and sprayed over the condensing coil 33 of the Rankine cycle circuit employed as the regenerator coil for adding heat to the hygroscopic solution, and utilizing exhaust air from the building complex as scavanger air in said regenerator as shown in FIG. 1. As shown, scavanger air into the regenerator is additionally heated as required by heater means 70 with control means 71 responsive to the hygroscopic solution level in the regenerator sump. In this manner the heat used as a result of condensing the working fluid of the Rankine cycle is reclaimed and usefully employed in the dehumidifier/humidifier D.

Referring now to the chilled thermal mass C, there is a separate low temperature liquid storage tank 40 surrounded by insulation (not shown) and adapted to store chilled water as a result of the thermodynamic availability of terrestrial re-radiation. In other words, the thermal mass C is a cold reservoir into which chilled liquid is moved for subsequent use. Accordingly, the mass C advantageously utilizes exterior heat exchange means 41 in the form of coils which is a dissipator of heat by means of terrestrial re-radiation, since outside space temperature is a pre-determined times lower than the thermal mass temperature in mass C. A heat exchange coil 45 is immersed in tank 40 in a fluid circuit with the coils of means 41. A pump 42 is operable to circulate the low temperature chilled water when required as controlled by a differential control means 43 with temperature responsive means 44 and 44' and in the thermal mass C and exchange means 41 respectively. The control means 43 is set so that the pump 42 is operated thereby only when the re-radiation temperature is less than the thermal mass temperature within the tank 40 but above a pre-determined minimum temperature.

The means C involves the liquid storage tank 40 filled with a liquid mass such as water, or an aqueous solution (ethylene glycol), to be stored and advantageously used at low temperatures and above freezing. Immersed in the storage tank 40 is a heat transferring or exchanging coil 47 for conducting chilled fluid through the first mentioned exchangers E1-E3. The coil 47 is in a circuit comprised of the aforementioned pipes P3 and P4 extended through the controlling valves V1 and V2 at said exchangers and controlled by the thermostats T1-T3 respectively (see FIGS. 3, 4 and 5). The said liquid is chilled by the source of cold and a pump 46 circulates said liquid to serve as the heat transfer media for the absorption of heat into mass C (or the transfer of heat thereto) by means of the heat exchange coil 47 immersed in the tank 40 of means C; and all of which is controlled by sequence and diverting valves V5 and V6. In accordance with this invention, when the chilled thermal mass C is at a sufficiently low temperature the flow of said liquid is through the heat exchange coil 47 to the distributing pipe P3 and returned by pipe P4 as controlled by valves V5 and V6, and alternately when the prime mover drives the refrigeration unit K the output thereof is advantageously useable in which case the sequence and diverting valves V5 and V6 direct the flow from the evaporator means 48 of means K to the distributing pipe P3 and returned by pipe P4. As shown, control means 50 responsive to temperature of thermal mass C governs valves V5 and V6 to firstly cause chilled liquid to flow through coil 47 on a rise in chilled liquid supply temperature above a predetermined upper temperature limit, the amount increasing with a rise in temperature above this limit so as to achieve peak load shaving, and to secondly cause chilled liquid to flow exclusively from the refrigeration means K when discharge temperature is below a predetermined upper temperature limit. In this way, chilled liquid collected, for example during nocternal hours, through terrestrial re-radiation or by off peak operation of refrigeration means K and the storage of chilled liquid thereby in tank 40 is subsequently available for the aforesaid peak load shaving. The refrigeration unit K is driven by a motor-generator MG1 and/or alternately by a prime mover R. Upon demand from said control means 50 the compressor 49 of means K is driven either by the motor-generator MG1 or by the prime mover R when energy is thermodynamically available from the thermal mass means.

The vapor compression refrigeration means K involves generally a compressor 49 and an evaporator 48. Condensors 51-52 provide separate fluid circuits, one to recirculate fluid through a cooling tower 55. By using a double bundle condensor, refrigerant condenses on a common side of a shell about which both bundles are arranged with controls such that heat is preferentially transferred to the space heating bundle with thermal balance maintained by dissipating excess heat to the cooling tower 55. Heat is extracted by a heat exchange coil of condensor 51 in a line extending in a loop from the return pipe P2 so as to draw cooler return fluid by means of a pump 60 thereby replaced as heated fluid, for instance at 130° F, in supply pipe P1 for subsequent end use in the heat exchangers E1-E3. Condenser coil 51 is for the primary reclamation of evaporator rejected heat and heat of compression from means K, while the condenser coil 52 is for the secondary reclamation of the excess evaporator load plus the heat of compression. The loop from pipe P2 through the condenser coil 51 is controlled by a valve V7, such that if upstream temperature in pipe P2 exceeds a predetermined high limit sensed by control means 72 then flow by-passes coil 51, while a temperature below said limit causes flow through coil 51 from pipe P2. The cooling tower involves a plurality of heat exchange circuits, one in the form of a coil 61 in a line from the condensor coil 33 and another in the form of a distribution header 62 in a line extending selectively from the tower sump and the dehumidifier second stage coil 53 for the further reclamation of heat in the final stage of condensing the working fluid in the Rankine cycle return line 34. A valve 63 responsive to head pressure control means at the pressure side of the refrigeration expansion valve 65 transfers the sump fluid from pump 64 through the coil 52 to the distribution header 62 when pressure drops in said refrigerant line (see FIG. 6). In practice, the cooling tower 55 minimizes residual heat dissipated to atmosphere by reclaiming the remaining heat from said separate heat sources and re-using it in the manner shown.

Referring now to the drive and/or motivation of the refrigeration means K, there is a drive chain 51, shafting or the like, that transmits power from the Rankine cycle prime mover R and through a motor-generator MG1 to a compressor 49 or to energy storage means E. Preferably, the storage means E is a mechanical "peak-power energy system" comprised of a fly wheel 60 coupled to a motor-generator MG2 to be in a circuit with the prime mover motor-generator MG1. The motor-generator MG2 functions either as a motor during off-peak periods to accelerate the fly wheel 60 and thereby store energy, or to be turned as a generator during peak periods to generate electrical power by drawing off stored energy in the fly wheel. This form of energy storage is very efficient and consumes less space as related to other forms of energy storage. As shown, the motor or generator function is governed by switch 61 adapted to alternately put the two motor-generators in circuit with each other or to remove motor-generator MG2 from said circuit and replace motor-generator MG1 in circuit with incoming power lines 62. As shown, the compressor 49 of the means K delivers refrigerant through a condensor system for expansion in the evaporator 48, the compressor 49 being driven individually and/or jointly by the Rankine cycle prime mover R and said motor-generator MG1. Alternately, excess power from the Rankine cycle prime mover R is delivered as excess electrical energy from motor-generator MG1 for storage as by mechanical means, capacitive, inductive or by electrochemical means (batteries).

The motor-generator MG1 is primarily a motor that assists or replaces the power of the prime mover R, and all of which is coupled through the shafting 51 to the refrigeration compressor 49 by means of a clutch (one way) 66. The motor-generators MG1 and MG2 are preferably dynamo electric machines of the induction type, squirrel cage induction motors to be operated at a speed greater than the synchronous speed when functioning as a generator driven by said prime mover and wheel 60 respectively, whereby a voltage is induced in a direction reversed from the motoring voltage so as to deliver current to the power lines connected thereto. The power lines 62 are suitably connected by switch 61 to said motor-generators and extended thereby to the auxillary equipment such as the fans 11 and 12, and pumps 19, 42, and 46. As shown, there is a speed changer 67 (preferably a speed increaser) between the prime mover R and the motor-generator MG1 to effect a speed greater than the synchronous speed when operating as a generator. Clutch 66 is governed by suitable control means 68 associated with return pipe P4 so to be disengaged when there is no demand for refrigeration. Thus, it will be apparent that the said motor-generator MG1 will operate to supplement power or to replace power as required, and as well to operate as a generator of electrical power, when refrigeration is not required and with the means E capable of storing excess electrical energy during off-peak periods and available through switch 61 when required.

Having described only a typical preferred form and application of my invention, I do not wish to be limited or restricted to the specific details herein set forth, but wish to reserve to myself any modifications or variations that may appear to those skilled in the art:

I claim:

1. A solar insolation powered air conditioning system wherein heated and chilled fluid is stored for subsequent use in heat exchanger means to temper building zone air, and including; heat concentrating collector means for the absorption of solar heat into a high temperature heat transfer fluid, a stratified thermal mass having high to moderate heat range heat storage sections, pump means circulating said heat transfer fluid through said collector means and through a heat exchange means into the high heat range section of said mass and from the low heat range section thereof returning said high temperature heat transfer fluid to said collector means, a working fluid subjected to high temperature in said high heat range section by heat transfer means in the thermal mass and pressurized into its vapor phase thereby, a heat transfer means for a heating fluid and located in and subjected to the moderate temperature in said moderate heat range section of the thermal mass, circulation means transporting said heating fluid to and from said building zone, a prime mover with an expander deriving work energy out of said pressurized working fluid, condensor means converting said working fluid into its liquid phase and means injecting said liquid phase fluid into said heat transfer means therefor, refrigeration means driven by said prime mover and having a chilled fluid circulation means transporting said chilled fluid to and from said building zone, and heat exchanger means at said building zone alternately drawing upon said heating and chilled fluids as required by thermostat control means therefor to temper the air.

2. The solar powered air conditioning system as set forth in claim 1, wherein an electric motor-generator is driven by said prime mover and drives the refrigeration means.

3. The solar powered air conditioning system as set forth in claim 1, wherein an induction motor-generator operated by means at greater than synchronous speed is driven by said prime mover and drives the refrigeration means.

4. The solar powered air conditioning system as set forth in claim 1, wherein an electric motor-generator is transposed between said prime mover and refrigeration means with clutch means for disengaging the latter.

5. The solar powered air conditioning system as set forth in claim 1, wherein an induction motor-generator operated by means at greater than synchronous speed is driven by said prime mover and drives the refrigeration means through disengageable clutch means.

6. The solar powered air conditioning system as set forth in claim 1, wherein an electric motor-generator is driven as a motor by said prime mover with an inertia wheel for storage of energy alternately driving it as a generator for supplying power.

7. The solar powered air conditioning system as set forth in claim 1, wherein a first motor-generator is driven by said prime mover driving said refrigeration means, and wherein a second motor-generator is in circuit with the first motor-generator and driven thereby as a motor with an inertia wheel for energy storage and alternately driven as a generator by said wheel for supplying power.

8. The solar powered air conditioning system as set forth in claim 1, wherein a first induction motor-generator operated by means at greater than synchronous speed is driven by said prime mover and drives the refrigeration means, and wherein a second induction motor-generator is in circuit with the first induction motor-generator and driven thereby as a motor with an inertia wheel for energy storage and alternately driven as a generator by said wheel for powering said first induction motor-generator.

9. The solar powered air conditioning system as set forth in claim 1, wherein a first induction motor-generator is transposed between said prime mover and refrigeration means with clutch means for disengaging the latter, and wherein a second induction motor-generator is in circuit with the first induction motor-generator and driven thereby as a motor with an inertia wheel for energy storage and alternately driven as a generator by said wheel for powering said first induction motor-generator.

10. A solar insolation powered humidity controlled air conditioning system wherein heated and chilled fluid is stored for subsequent use in heat exchanger means to temper building zone air, and including; a dehumidifier means havng a contactor section subjecting primary induction air to a hygroscopic solution with temperature control means therefor and having a regenerator section with heat dissipating means for heating said solution, circulation means delivering said primary induction air to said building zone, heat concentrating collector means for the absorption of solar heat into a high temperature heat transfer fluid, a stratified thermal mass having high to moderate heat range heat storage sections, pump means circulating said heat transfer fluid through said collector means and through a heat exchange means into the high heat range section of said mass and from the low heat range section thereof returning said high temperature heat transfer fluid to said collector means, a working fluid subjected to high temperature in said high heat range section by heat transfer means in the thermal mass and pressurized into its vapor phase thereby, a heat transfer means for a heating fluid and located in and subjected to the moderate temperature in said moderate heat range section of the thermal mass, circulation means transporting said heating fluid to and from said building zone, a prime mover with an expander deriving work energy out of said pressurized working fluid, said heat dissipating means of the dehumidifier comprising a condensor means converting said working fluid into its liquid phase and means injecting said liquid phase fluid into said heat transfer means therefor, refrigeration means driven by said prime mover and having a chilled fluid circulation means transporting said chilled fluid to and from said building zone, and heat exchanger means at said building zone alternately drawing upon said heating and chilled fluids as required by thermostat control means therefor to temper the air.

11. The solar powered humidity controlled air conditioning system as set forth in claim 10, wherein the dehumidifier means temperature control means comprises a chilling coil in the contactor section thereof and supplied with said chilled fluid circulated from the said refrigeration means.

12. The solar powered humidity controlled air conditioning system as set forth in claim 10, wherein the dehumidifier means temperature control means comprises a cooling coil in the contactor section thereof and means supplying cooled fluid thereto from a cooling tower operating in conjunction with a condensor in the refrigeration means.

13. The solar powered humidity controlled air conditioning system as set forth in claim 10, wherein the dehumidifier means temperature control means comprises a first stage cooling coil in the contactor section thereof and means supplying cooled fluid thereto from a cooling tower operating in conjunction with a condensor in the refrigeration means, and a second stage chilling coil in the contactor section thereof and supplied with said chilled fluid circulated from the said refrigeration means.

14. The solar powered humidity controlled air conditioning system as set forth in claim 10, wherein the heat dissipating means comprising said condensor is in circuit with the liquid phase of the working fluid through a cooling tower operating in conjunction with a condensor in the refrigeration means.

15. The solar powered humidity controlled air conditioning system as set forth in claim 10, wherein the dehumidifier means temperature control means comprises a chilling coil in the contactor section thereof and supplied with said chilled fluid circulated from the said refrigeration means, and wherein the heat dissipating means comprising said condensor is in circuit with the liquid phase of the working fluid through a cooling tower operating in conjunction with a condensor in the refrigeration means.

16. The solar powered humidity controlled air conditioning system as set forth in claim 10, wherein the dehumidifier means temperature control means comprises a chilling coil in the contactor section thereof and means supplying cooled fluid thereto from a cooling tower operating in conjunction with a condensor in the refrigeration means, and wherein the heat dissipating means comprising said condensor is in circuit with the liquid phase of the working fluid through a cooling tower operating in conjunction with a condensor in the refrigeration means.

17. The solar powered humidity controlled air conditioning system as set forth in claim 10, wherein the dehumidifier means temperature control means comprises a first stage cooling coil in the contactor section thereof and means supplying cooled fluid thereto from a cooling tower operating in conjunction with a condensor in the refrigeration means, and a second stage chilling coil in the contactor section thereof and supplied with said chilled fluid circulated from the said refrigeration means, and wherein the heat dissipating means comprising said condensor is in circuit with the liquid phase of the working fluid through a cooling tower operating in conjunction with a condensor in the refrigeration means.

18. A solar insolation powered and re-radiation assisted air conditioning system wherein heated and chilled fluid is stored for subsequent use in heat exchanger means to temper building zone air, and including; heat concentrating collector means for the absorption of solar heat into a first high temperature heat transfer fluid, a stratified high temperature mass having high to moderate heat range heat storage sections, pump means circulating said high temperature heat transfer fluid through said collector means and through a heat exchange means into the high heat range section and from the low heat range section returning said high temperature heat transfer fluid to said collector means, a working fluid subjected to high temperature in said high heat range section by heat transfer means in the high temperature thermal mass and pressurized into its vapor phase thereby, a heat transfer means for a heating fluid and located in and subjected to the moderate temperature in said moderate heat range section of the thermal mass, circulation means transporting said heating fluid to and from said building zone, a prime mover with an expander deriving work energy out of said pressurized working fluid, condensor means converting said working fluid into its liquid phase and means injecting said liquid phase fluid into said heat transfer means therefor, heat radiating means for the dissipation of heat from a second low temperature heat transfer fluid, a low temperature thermal mass and pump means circulating said low temperature heat transfer fluid through said radiating means and through a heat exchange means into and from said low temperature thermal mass, heat transfer means in the low temperature thermal mass supplying a first chilled fluid, refrigeration means driven by said prime mover and supplying a second chilled fluid, circulation means combining said first and second chilled fluids and transporting the same to and from said building zone, and heat exchanger means at said building zone alternately drawing upon said first and second chilled fluids as required by thermostat control means therefor to temper the air.

19. The solar powered and re-radiation assisted air conditioning system as set forth in claim 18, wherein control means responsive to temperature in the low temperature thermal mass selects the chilled fluid flow through said heat exchange means in said low temperature thermal mass and refrigeration means respectively.

20. The solar powered and re-radiation assisted air conditioning system as set forth in claim 18, wherein variable control means responsive to temperature in the low temperature thermal mass proportionately selects the chilled fluids according to low temperature availability through said heat exchange means in the low temperature thermal mass and refrigeration means respectively.

21. The solar powered and re-radiation assisted air conditioning system as set forth in claim 18, wherein an electric motor-generator is driven by said prime mover and drives the refrigeration means, and wherein control means responsive to temperature in the low temperature thermal mass selects the chilled fluid flow through said heat exchange means in said low temperature thermal mass and refrigeration means respectively.

22. The solar powered and re-radiation assisted air conditioning system as set forth in claim 18, wherein an electric motor-generator is driven as a motor by said prime mover with an inertia wheel for storage of energy alternately driving it as a generator for supplying power, and wherein control means responsive to temperature in the low temperature thermal mass selects the chilled fluid flow through said heat exchange means in said low temperature thermal mass and refrigeration means respectively.

23. The solar powered and re-radiation assisted air conditioning system as set forth in claim 18, wherein a first motor-generator is driven by said prime mover driving said refrigeration means, and wherein a second motor-generator is in circuit with the first motor-generator and driven thereby as a motor with an inertia wheel for energy storage and alternately driven as a generator by said wheel for supplying power, and wherein control means responsive to temperature in the low temperature thermal mass selects the chilled fluid flow through said heat exchange means in said low temperature thermal mass and refrigeration means respectively.

24. A solar insolation powered and re-radiation assisted humidity controlled air conditioning system wherein heated and chilled fluid is stored for subsequent use in heat exchanger means to temper building zone air, and including; a dehumidifier means having a contactor section subjecting primary air to a hygroscopic solution with temperature control means therefor and having a regenerator section with heat dissipating means for heating said solution, circulation means delivering said primary induction air to said building zone, heat concentrating collector means for the absorption of solar heat into a first high temperature heat transfer fluid, a stratified high temperature thermal mass having high to moderate heat range heat storage sections, pump means circulating said high temperature heat transfer fluid through said collector means and through a heat exchange means into the high heat range section and from the low heat range section returning said high temperature heat transfer fluid to said collector means, a working fluid subjected to high temperature in said high heat range section by heat transfer means in the high temperature thermal mass and pressurized into its vapor phase thereby, a heat transfer means for a heating fluid and located in and subjected to the moderate temperature in said moderate heat range section of the thermal mass, circulation means transporting said heating fluid to and from said building zone, a prime mover with an expander deriving work energy out of said pressurized working fluid, said heat dissipating means of the dehumidifier comprising a condensor means converting said working fluid into its liquid phase and means injecting said liquid phase fluid into said heat transfer means therefor, heat radiating means for the dissipation of heat from a second low temperature heat transfer fluid, a low temperature thermal mass and pump means circulating said low temperature heat transfer fluid through said radiating means and through a heat exchange means into and from said low temperature thermal mass, heat transfer means in the low temperature thermal mass supplying a first chilled fluid, refrigeration means driven by said prime mover and supplying a second chilled fluid, circulation means combining said first and second chilled fluids and transporting the same to and from said building zone, and heat exchanger means at said building zone alternately drawing upon said first and second chilled fluids as required by thermostat control means therefor to temper the air.

25. The solar powered and re-radiation assisted humidity controlled air conditioning system as set forth in claim 24, wherein control means responsive to temperature in the low temperature thermal mass selects the first and second chilled fluid flow through said heat exchange means in said low temperature thermal mass and refrigeration means respectively.

26. The solar powered and re-radiation assisted humidity controlled air conditioning system as set forth in claim 24, wherein the dehumidifier means temperature control means comprises a chilling coil in the contactor section thereof and supplied with said chilled fluid circulated from the said refrigeration means, and wherein control means responsive to temperature in the low temperature thermal mass selects the first and second chilled fluid flow through said heat exchange means in said low temperature thermal mass and refrigeration means respectively.

27. The solar powered and re-radiation assisted humidity controlled air conditioning system as set forth in claim 24, wherein the dehumidifier means temperature control means comprises a chilling coil in the contactor section thereof and means supplying cooled fluid thereto from a cooling tower operating in conjunction with a condensor in the refrigeration means, and wherein control means responsive to temperature in the low temperature thermal mass selects the first and second chilled fluid flow through said heat exchange means in said low temperature thermal mass and refrigeration means respectively.

28. The solar powered and re-radiation assisted humidity controlled air conditioning system as set forth in claim 24, wherein the heat dissipating means comprising said condensor is in circuit with the liquid phase of the working fluid through a cooling tower operating in conjunction with a condensor in the refrigeration means, and wherein control means responsive to temperature in the low temperature thermal mass selects the first and second chilled fluid flow through said heat exchange means in said low temperature thermal mass and refrigeration means respectively.

29. The solar powered and re-radiation assisted humidity controlled air conditioning system as set forth in claim 24, wherein the dehumidifier means temperature control means comprises a cooling coil in the contactor section thereof and means supplying cooled fluid thereto from a cooling tower operating in conjunction with a condensor in the refrigeration means, and wherein the heat dissipating means comprising said condensor is in circuit with the liquid phase of the working fluid through a cooling tower operating in conjunction with a condensor in the refrigeration means, and wherein control means responsive to temperature in the low temperature thermal mass selects the first and second chilled fluid flow through said heat exchange means in said low temperature thermal mass and refrigeration means respectively.

30. The solar powered and re-radiation assisted humidity controlled air conditioning system as set forth in claim 24, wherein the dehumidifier means temperature control means comprises a first stage cooling coil in the contactor section thereof and means supplying cooled fluid thereto from a cooling tower operating in conjunction with a condensor in the refrigeration means, and a second stage chilling coil in the contactor section thereof and supplied with said chilled fluid circulated from the said refrigeration means, and wherein the heat dissipating means comprising said condensor is in circuit with the liquid phase of the working fluid through a cooling tower operating in conjunction with a condensor in the refrigeration means, and wherein control means responsive to temperature in the low temperature thermal mass selects the first and second chilled fluid flow through said heat exchange means in said low temperature thermal mass and refrigeration means respectively.

* * * * *